US009085256B2

(12) United States Patent
Parker et al.

(10) Patent No.: US 9,085,256 B2
(45) Date of Patent: Jul. 21, 2015

(54) SELF-STABILIZING PLATFORM, CARRIER, OR BASE

(71) Applicant: OPOBOTICS, INC., Rocky Mount, NC (US)

(72) Inventors: Colin Parker, Rocky Mount, NC (US); Vikram B. Shah, Durham, NC (US)

(73) Assignee: OPOBOTICS, INC., Rocky Mount, NC (US)

( * ) Notice: Subject to any disclaimer, the term of this patent is extended or adjusted under 35 U.S.C. 154(b) by 0 days.

(21) Appl. No.: 14/208,612

(22) Filed: Mar. 13, 2014

(65) Prior Publication Data

US 2014/0262579 A1 Sep. 18, 2014

Related U.S. Application Data

(60) Provisional application No. 61/779,783, filed on Mar. 13, 2013.

(51) Int. Cl.
*B60P 9/00* (2006.01)

(52) U.S. Cl.
CPC .................................... *B60P 9/00* (2013.01)

(58) Field of Classification Search
CPC ................................................ B60P 9/00
USPC ........................................ 180/218; 280/64
See application file for complete search history.

(56) References Cited

U.S. PATENT DOCUMENTS

| | | | | |
|---|---|---|---|---|
| 3,014,547 | A * | 12/1961 | Van Der Lely | 180/308 |
| 3,669,026 | A * | 6/1972 | Mouritzen | 104/118 |
| 3,765,466 | A * | 10/1973 | Tsuruta | 152/210 |
| 4,177,734 | A * | 12/1979 | Rhoden | 104/138.2 |
| 4,209,269 | A * | 6/1980 | Martinez | 405/184.5 |
| 4,519,466 | A * | 5/1985 | Shiraishi | 180/7.1 |
| 4,981,080 | A * | 1/1991 | Elstone, III | 104/138.2 |
| 5,988,304 | A * | 11/1999 | Behrendts | 180/65.1 |
| 6,347,802 | B1 * | 2/2002 | Mackle et al. | 280/5.521 |

* cited by examiner

*Primary Examiner* — Joseph Rocca
*Assistant Examiner* — Jacob Knutson
(74) *Attorney, Agent, or Firm* — Ward and Smith, P.A.

(57) ABSTRACT

A two-wheel movable platform, carrier, or base having canted wheels is disclosed. In one embodiment, the two-wheel movable platform, carrier, or base includes adjustable canted wheels in which the angle of the canted wheels is adjustable. In this embodiment, the two-wheel movable platform, carrier, or base includes a pair of wheel assemblies mechanically coupled to a battery housing. Each of the wheel assemblies includes, for example, a mounting plate, a drive motor arranged in a motor housing, a canted wheel that is driven by the drive motor, and an angle-adjusting motor for adjusting the angle of the canted wheel. In another embodiment, the two-wheel movable platform, carrier, or base includes canted wheels that are set at a fixed angle.

2 Claims, 11 Drawing Sheets

Two-wheel carrier 100
Wheel assembly 110B
Wheel assembly 110A
Angle-adjusting motor 122
Angle-adjusting motor 122
Drive motor 116
Drive motor 116
Motor housing 118
Motor housing 118
Mounting plate 114
Mounting plate 114
Battery housing 112
Canted wheel 120
Canted wheel 120
5.750
0.750
2.200
2.176
θ
5.135
0.500
2.500
4.148
5.250
10.000
10.000
(All measurements shown in inches)

SELF-STABILIZING PLATFORM, CARRIER, OR BASE

CROSS-REFERENCE TO RELATED APPLICATIONS

This application claims the benefit of U.S. Provisional Application No. 61/779,783, filed Mar. 13, 2013, which is incorporated herein by reference in its entirety.

TECHNICAL FIELD

The presently disclosed subject matter relates generally to self-stabilizing platforms, carriers, or bases, and more particularly to a self-stabilizing platform, carrier, or base having two wheels positioned at one or more angles in such a way to stabilize the platform, carrier, or base.

BACKGROUND

The stability of platforms, carriers, or bases, including, but not limited to, movable platforms, carriers, or bases, can depend on certain conditions, which may be variable, such as those conditions encountered in uneven or rough terrain. The degree of stability of a platform, carrier, or base can depend, for example, on the amount of load (e.g., weight) on the platform, the center of gravity of the platform when loaded, the type of terrain being traversed (e.g., smooth, rough, or uneven), the slope or angle of the terrain being traversed, and the like. Consequently, a movable platform, carrier, or base that is designed to be stable when traversing smooth terrain may become unstable when traversing rough terrain. Similarly, a platform, carrier, or base that is designed to be stable when having a low center of gravity may become unstable when having a high center of gravity. As a result, configuring a platform, carrier, or base to operate with good stability under all conditions can be difficult.

SUMMARY

A self-stabilizing two-wheel movable platform, carrier, or base having canted wheels is provided. In one aspect, the two-wheel movable platform, carrier, or base includes adjustable canted wheels, in which the angle of the canted wheels is adjustable in such a way to impart stability in the platform, carrier, or base. An aspect of the two-wheel movable platform, carrier, or base that has adjustable canted wheels is that the angle of the canted wheels can be adjusted in real time for maintaining stability when in motion and under changing conditions.

Another aspect of the two-wheel movable platform, carrier, or base that has adjustable canted wheels is that the respective angles of the two canted wheels can be adjusted independently or together. As a result, the respective angles of the two canted wheels can be the same or different.

In another aspect, the two-wheel movable platform, carrier, or base includes canted wheels that are set at a fixed angle, wherein the fixed angle imparts stability in the platform, carrier, or base.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
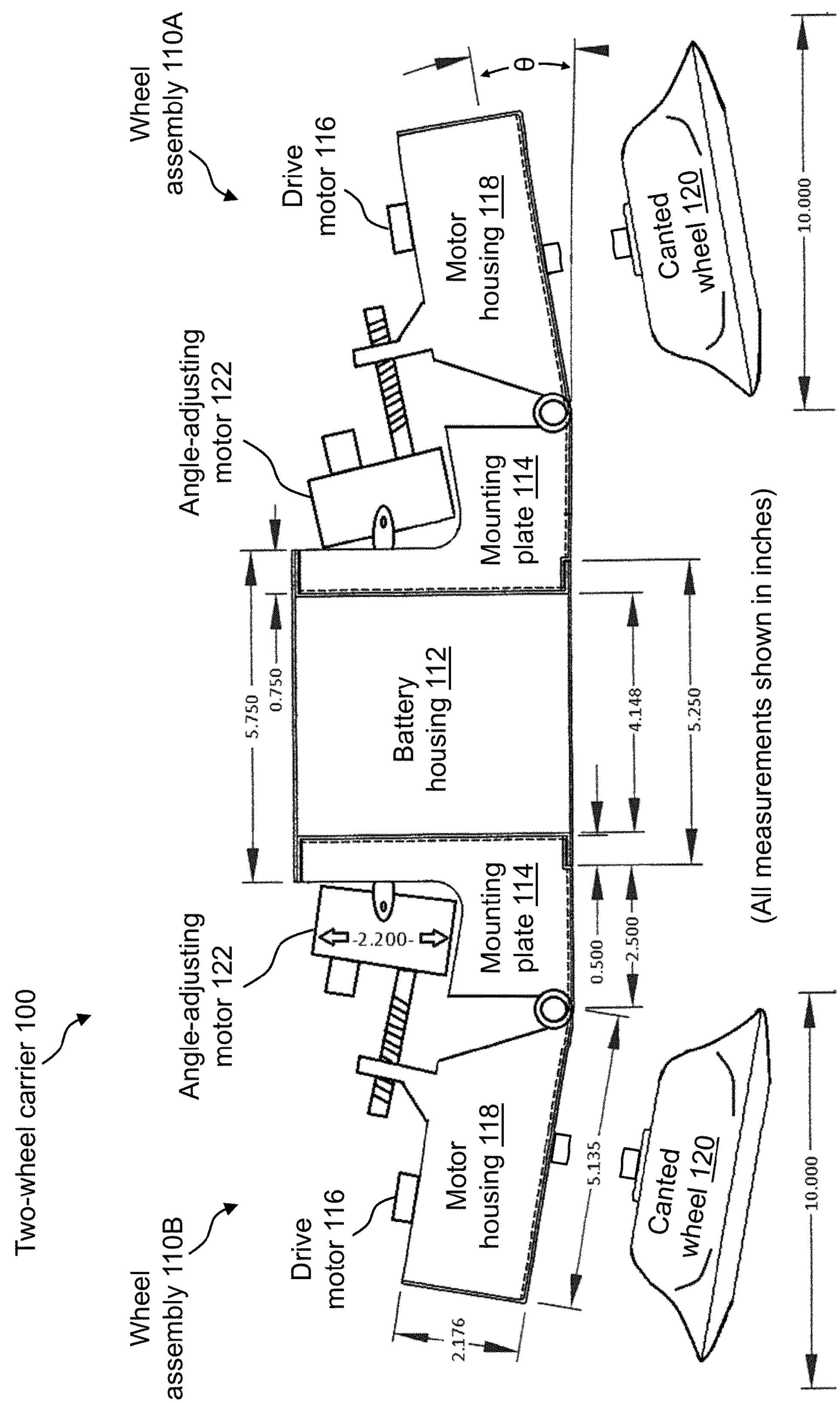
Figure 2:
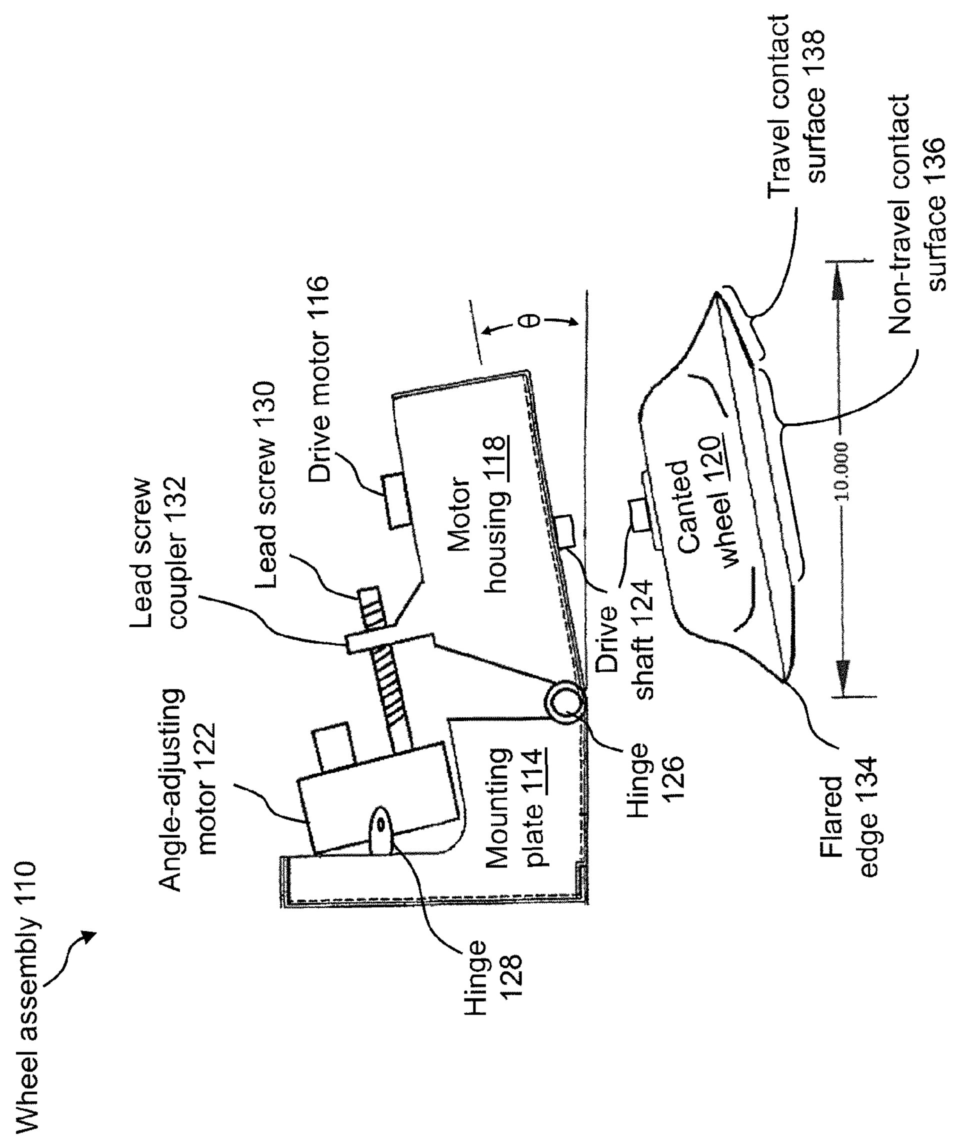
Figure 3:
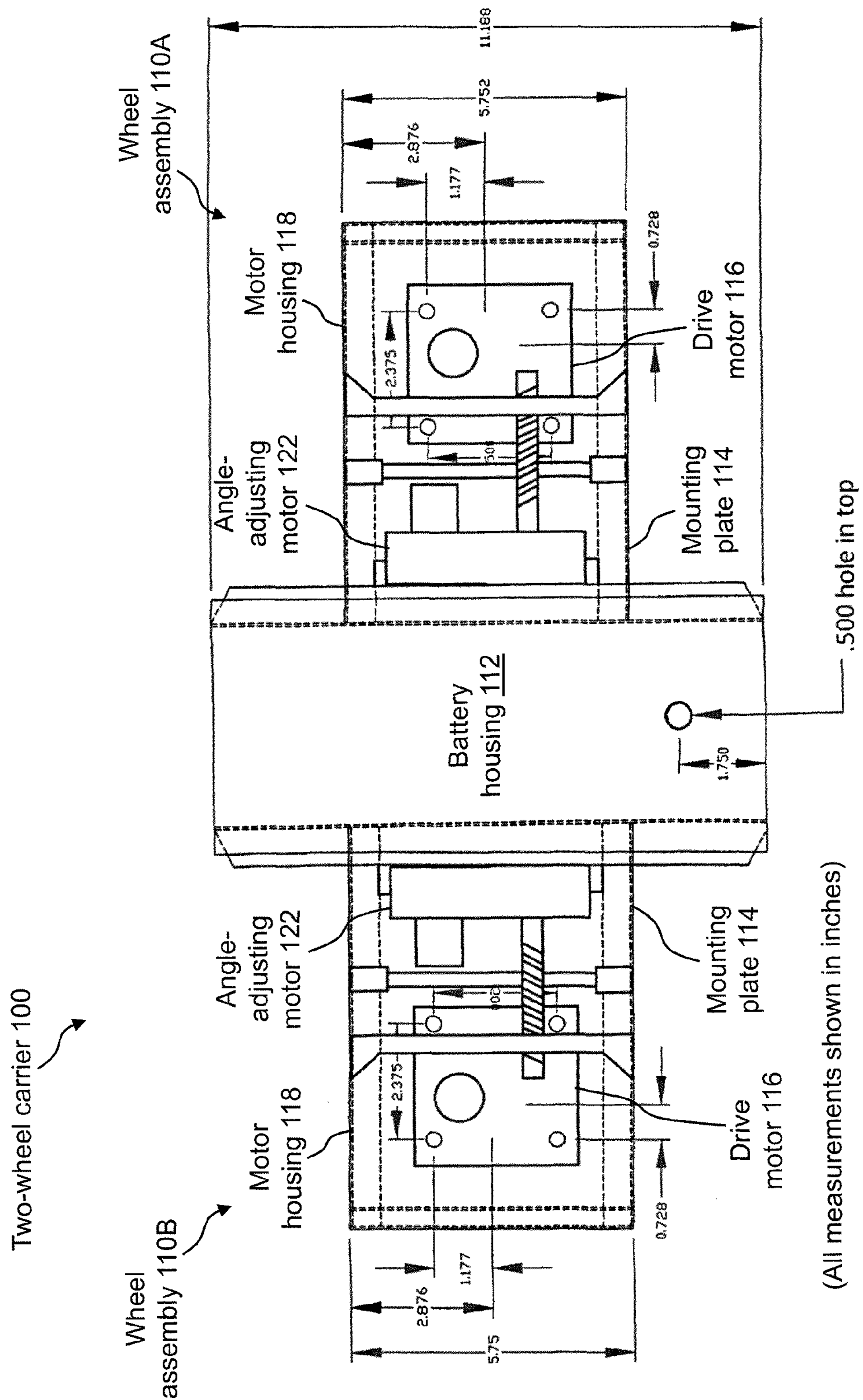
Figure 4:
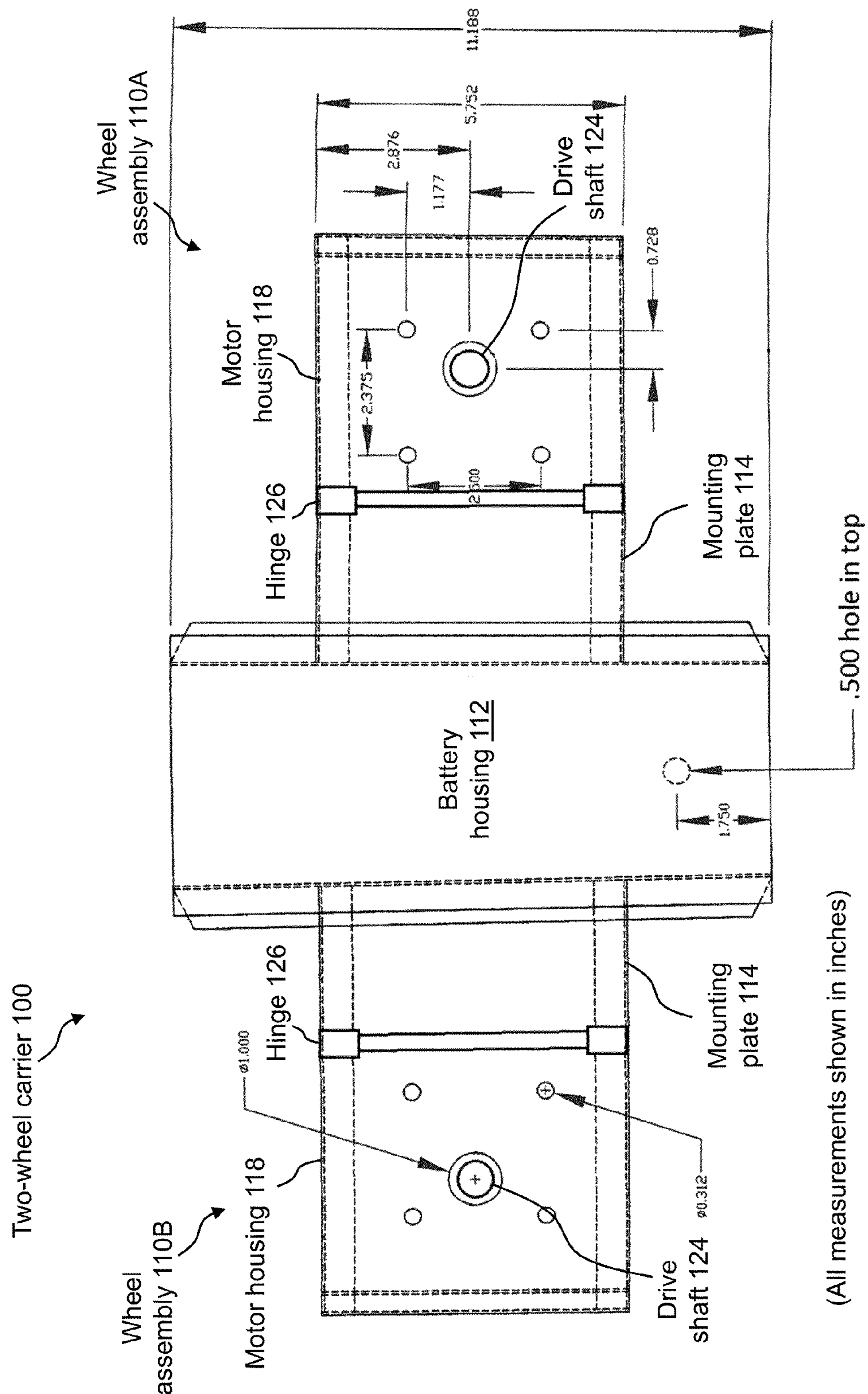
Figure 5:
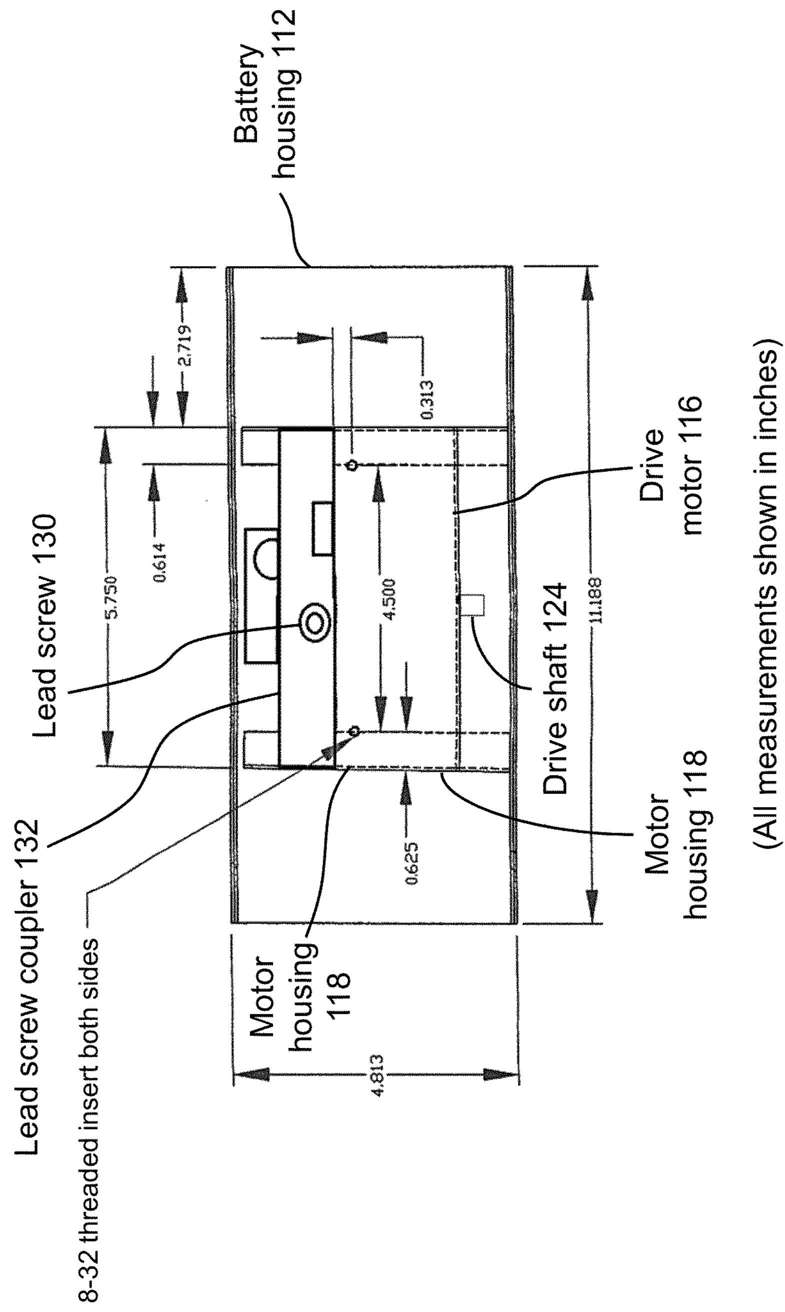
Figure 6:
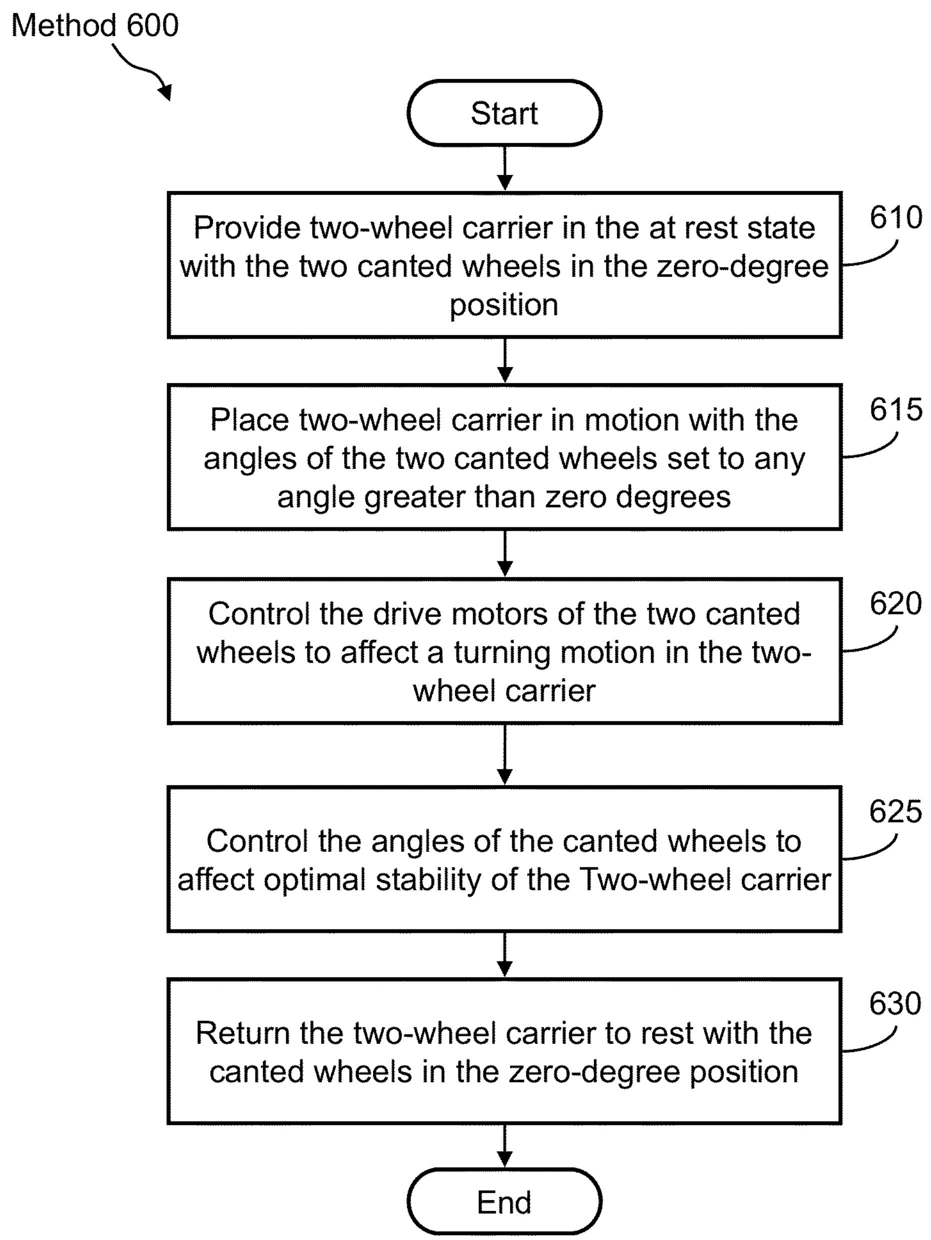
Figure 7:
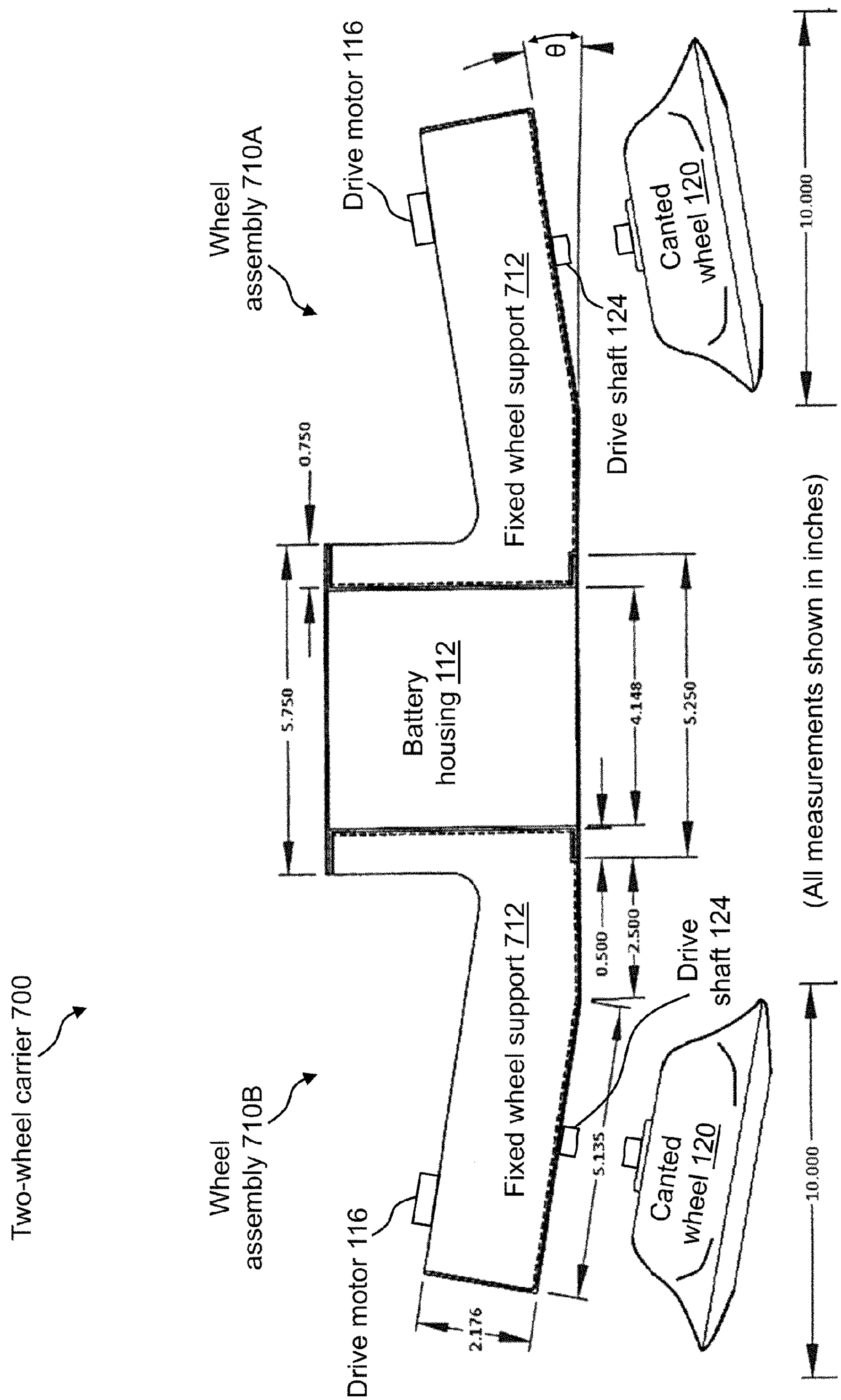
Figure 8:
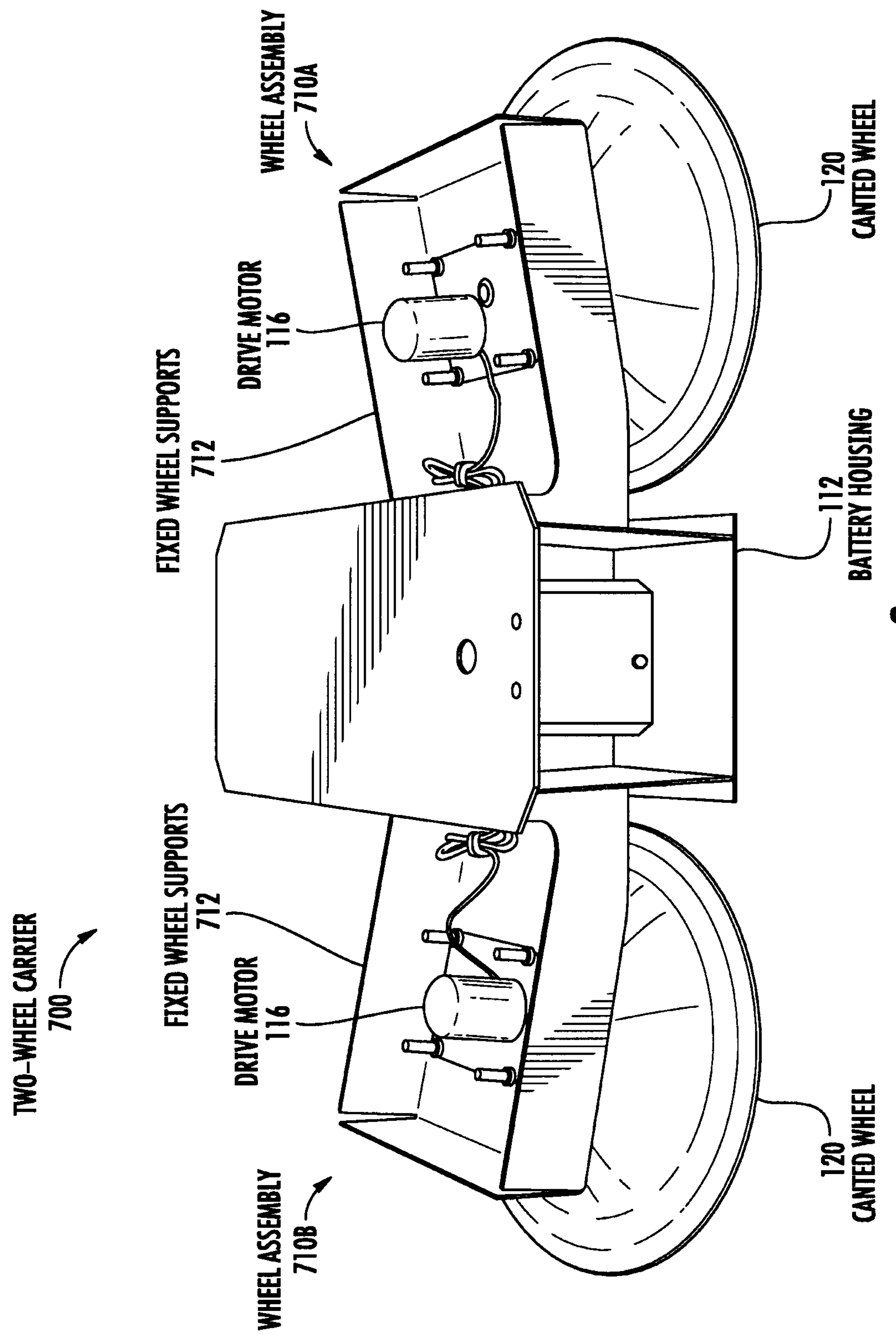
Figure 9:
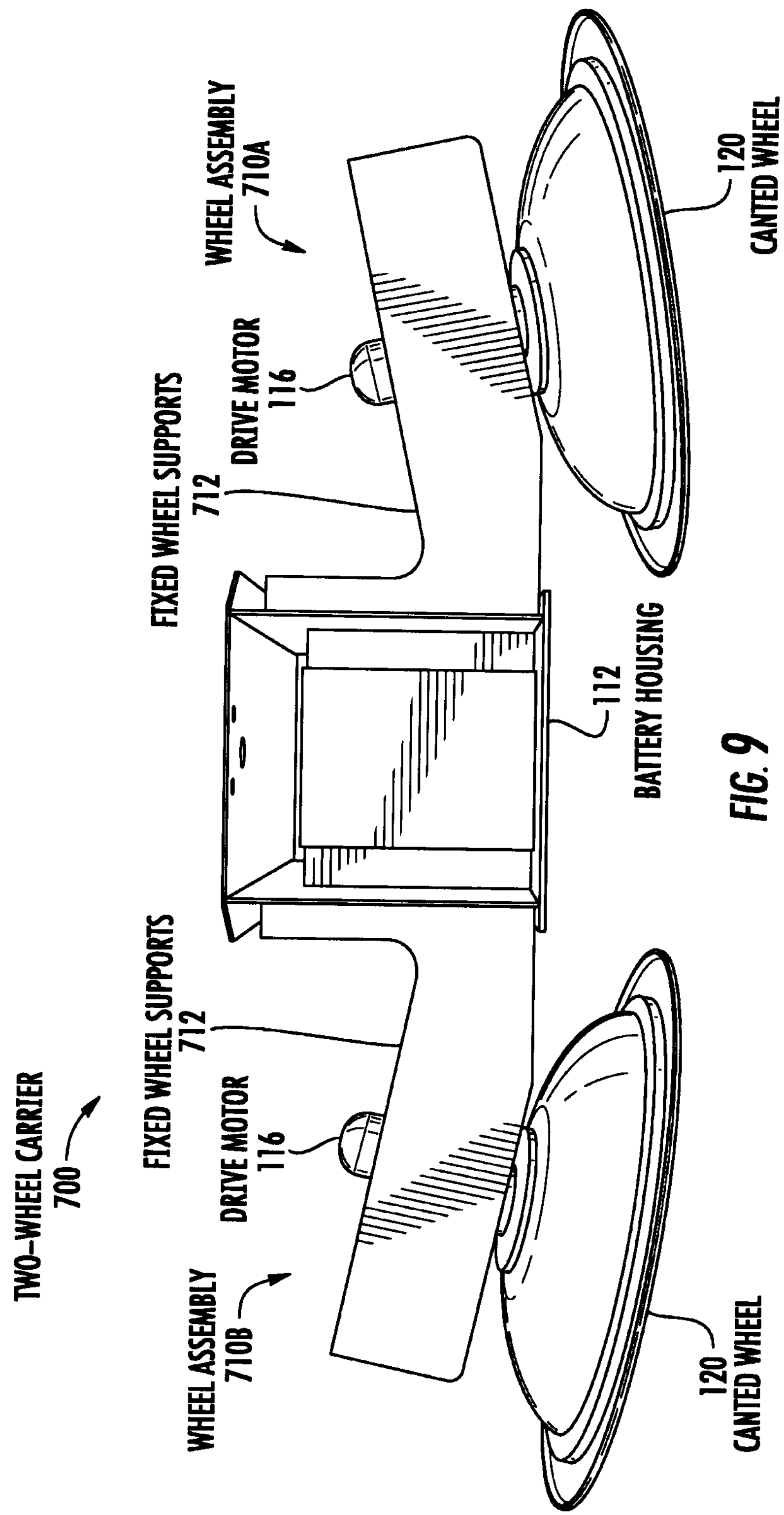
Figure 10:
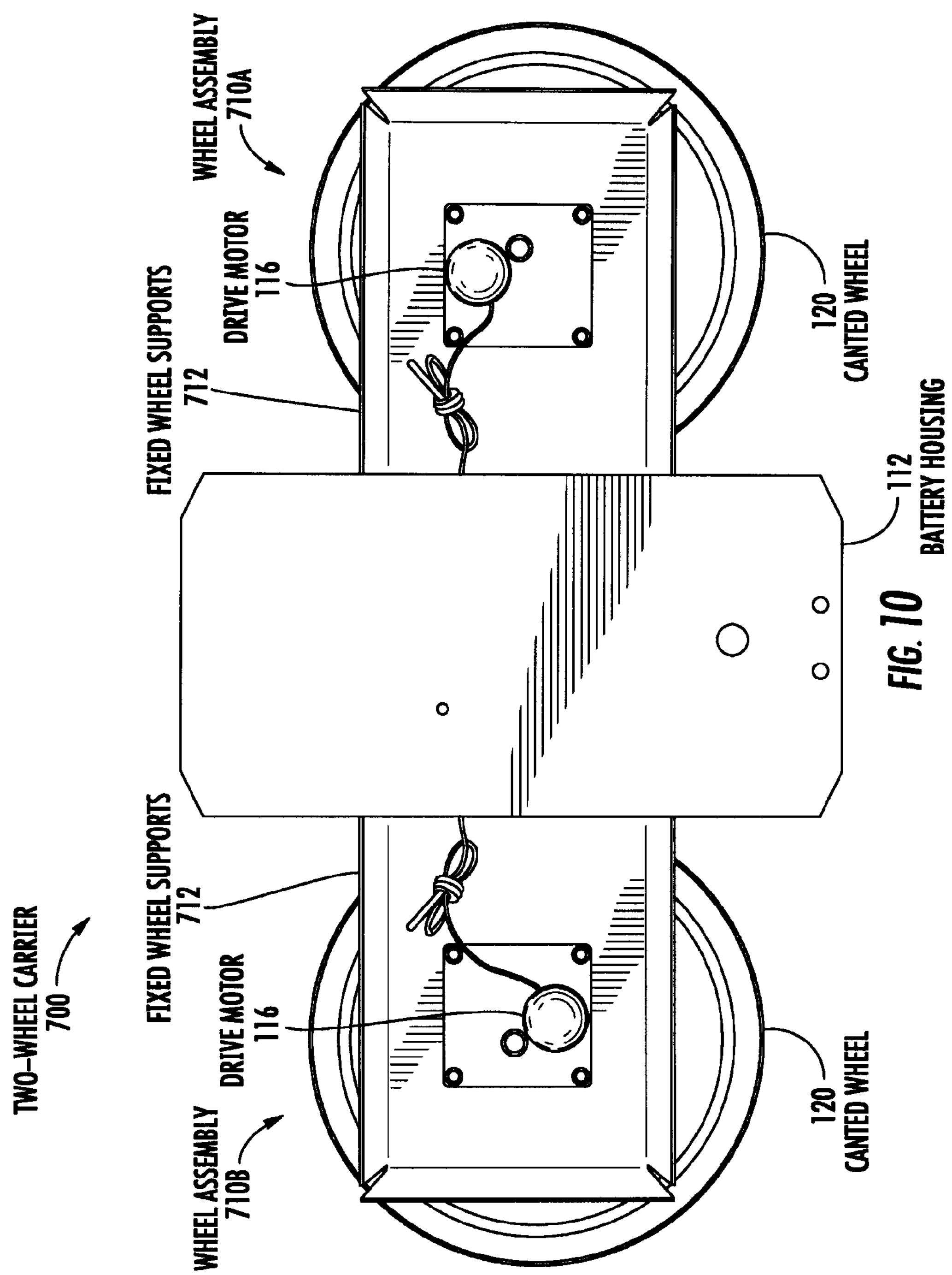
Figure 11:
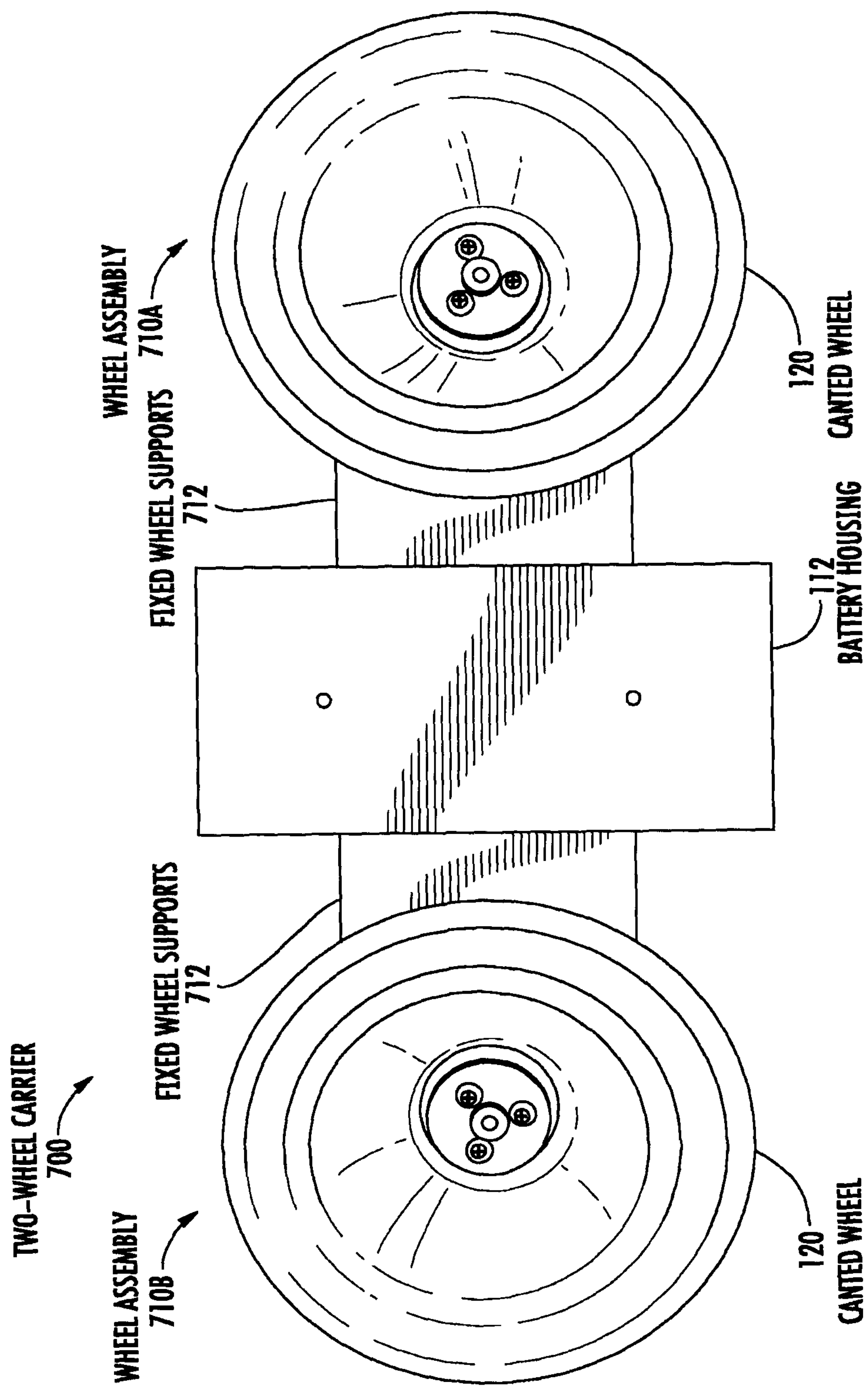

Having thus described the presently disclosed subject matter in general terms, reference will now be made to the accompanying Drawings, which are not necessarily drawn to scale, and wherein:

FIG. 1 illustrates a side view of an embodiment of a two-wheel carrier that includes adjustable canted wheels;

FIG. 2 illustrates a side view of one wheel assembly of the two-wheel carrier, wherein the wheel assembly includes an adjustable canted wheel;

FIG. 3 illustrates a top view of the two-wheel carrier that includes adjustable canted wheels;

FIG. 4 illustrates a bottom view of the two-wheel carrier that includes adjustable canted wheels;

FIG. 5 illustrates an end view of the two-wheel carrier that includes adjustable canted wheels;

FIG. 6 illustrates a flow diagram of an embodiment of a method of using the two-wheel carrier that includes adjustable canted wheels;

FIG. 7 illustrates a side view of an embodiment of a two-wheel carrier that includes fixed canted wheels;

FIG. 8 illustrates a perspective view of the two-wheel carrier that includes fixed canted wheels;

FIG. 9 illustrates a side view of the two-wheel carrier that includes fixed canted wheels;

FIG. 10, illustrates a top view of the two-wheel carrier that includes fixed canted wheels; and FIG. 11 illustrates a bottom view, respectively, of the two-wheel carrier that includes fixed canted wheels.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a self-stabilizing two-wheel movable platform, carrier, or base having canted wheels, wherein the canted wheels are adjustable or can be positioned at a set angle to impart stability in the platform, carrier, or base. As used herein with respect to the presently disclosed platforms, carriers, or bases, "stability" means, for example, the ability to remain upright without tipping over and/or the ability to recover from an unstable condition to a stable condition. The term "self-stabilizing" refers to the ability of the presently disclosed platform, carrier, or base to return to a stable position without any external influence.

The presently disclosed platforms, carriers, or bases can be used in a variety of applications including, but not limited to, robotics, transporting materials from one location to another, e.g., moving articles in a warehouse, and the like. In particular embodiments, the presently disclosed platforms, carriers, or bases are used in robotics, e.g., as a base for a robotics system.

Referring now to FIG. 1, provided therein is a side view of one embodiment of a two-wheel carrier 100 that includes adjustable canted wheels. Two-wheel carrier 100 is one embodiment of a two-wheeled movable platform, carrier, or base. Referring once again to FIG. 1, two-wheel carrier 100 includes a pair of wheel assemblies 110, which are mechanically coupled in one embodiment to battery housing 112. Wheel assemblies 110, in other embodiments, can be coupled to any element or support unit suitable for providing support for wheel assemblies 110. This particular embodiment is used for illustrative purposes only and such support for wheel assemblies 110 is not limited to battery housing 112.

Referring once again to FIG. 1, in representative embodiments, wheel assembly 110A is mechanically coupled to one side of battery housing 112 and a wheel assembly 110B is mechanically coupled to an opposite side of battery housing 112, as shown. Each of the wheel assemblies 110 includes, for example, a mounting plate 114, a drive motor 116 arranged in a motor housing 118, a canted wheel 120 that is driven by drive motor 116, and an angle-adjusting motor 122 for adjusting the angle of the canted wheel 120. More details of wheel assembly 110 are described with reference to FIG. 2.

Battery housing 112 holds a battery (not shown) that provides power to the drive motor 116 and angle-adjusting motor 122 of each of the two wheel assemblies 110. The battery (not shown) can be a rechargeable or non-rechargeable battery. In one embodiment, the battery (not shown) is a 12 volt DC, 7 amp/hr rechargeable battery. Further, the top of battery housing 112 can serve as a platform for carrying a load (not shown). Alternatively, a separate platform (not shown) can be mounted atop battery housing 112 for carrying a load (not shown). In one embodiment, drive motor 116 is a 12 volt, 1.2 amp, DC motor capable of turning the drive wheels at about 25 rpms. In one embodiment, angle-adjusting motor 122 is a 12 volt, 1.2 amp, DC stepper motor capable of turning the drive wheels at about 25 rpms. One of ordinary skill in the art upon review of the presently disclosed subject matter would appreciate that any suitable battery system or motor drive system can be used with the presently disclosed wheel assemblies.

Referring now to FIG. 2 is provided a side view of one wheel assembly 110 of two-wheel carrier 100, wherein wheel assembly 110 includes an adjustable canted wheel 120. FIG. 2 shows that wheel assembly 110 includes mounting plate 114, drive motor 116, motor housing 118, canted wheel 120, and angle-adjusting motor 122, as described in FIG. 1. Wheel assembly 110 further includes a drive shaft 124 for mechanically coupling drive motor 116 to canted wheel 120, a hinge 126 for moveably coupling motor housing 118 to mounting plate 114, and a hinge 128 for moveably coupling angle-adjusting motor 122 to mounting plate 114. Angle-adjusting motor 122 further includes a lead screw 130. Motor housing 118 further includes a lead screw coupler 132, which comprises a bracket that includes a threaded hole for receiving lead screw 130 of angle-adjusting motor 122, as shown. Canted wheel 120 comprises, for example, a bell-shaped wheel that has a flared edge 134, as shown, although the wheels do not necessarily need to have a bell shape. Canted wheel 120 can be formed from any suitable material known in the art depending on the intended use of the carrier, the terrain over which the carrier is intended to traverse, and the weight of the load or cargo. In some embodiments, canted wheel 120 comprises a wheel selected from the group consisting of a metal wheel, a solid rubber tire, an inflatable tubeless tire, an inflatable tire comprising an inflatable inner tube, and a plastic wheel, including, but not limited to a thermoplastic material, such as acrylonitrile butadiene styrene (ABS).

By engaging angle-adjusting motor 122 and hinge 126, an angle θ of canted wheel 120 can be adjusted, for example, from about 0 degrees to about 20 degrees, including 0, 1, 2, 3, 4, 5, 6, 7, 8, 9, 10, 11, 12, 13, 14, 15, 16, 17, 18, 19, and 20 degrees, and fractions of whole degrees thereof, for example, 0.5, 1.5, 2.5, 3.5, 4.5, 5.5, 6.5, 7.5, 8.5, 9.5, 10.5, 11.5, 12.5, 13.5, 14.5, 15.5, 16.5, 17.5, 18.5, and 19.5 degrees, or in other embodiments, 0.25, 1.25, 2.25, 3.25, 4.25, 5.25, 6.25, 7.25, 8.25, 9.25, 10.25, 11.25, 12.25, 13.25, 14.25, 15.25, 16.25, 17.25, 18.25, and 19.25 degrees, or, in yet other embodiments, 0.75, 1.75, 2.75, 3.75, 4.75, 5.75, 6.75, 7.75, 8.75, 9.75, 10.75, 11.75, 12.75, 13.75, 14.75, 15.75, 16.75, 17.75, 18.75, and 19.75 degrees. Angle θ can be measured relative to a plane perpendicular to a plane extending from a centerpoint of a support for wheel assemblies 110, for example, a plane parallel to a side of battery housing 112. Said another way, angle θ can be measured relative to a plane parallel to at least one surface upon which the platform, carrier, or base is placed. As used herein, the term “placed” encompasses embodiments wherein the platform, carrier, or base is at rest, e.g., stationary, and/or in motion, and/or selectively alternating between being at rest and in motion.

When the angle θ of canted wheel 120 is set at about 0 degrees, a non-travel contact surface 136 of canted wheel 120 is in contact with the surface on which two-wheel carrier 100 is operating. Non-travel contact surface 136 comprises the flat, bottommost portion of canted wheel 120. Non-travel contact surface 136 is the portion of canted wheel 120 that is in contact with a surface, e.g., the ground or a floor, when two-wheel carrier 100 is at rest. In the 0-degree position, any rotation of canted wheel 120 yields little to no motion of two-wheel carrier 100. It is intended, however, that canted wheel 120 not be rotating in this 0-degree position.

By contrast, for two-wheel carrier 100 to move, the angle θ of canted wheel 120 is set to any angle that is greater than about 0 degrees, such as at least about 5 degrees. In such embodiments, a different portion of canted wheel 120 is in contact with the surface on which two-wheel carrier 100 is operating. More particularly, when the angle θ of canted wheel 120 is greater than about 0 degrees, two-wheel carrier 100 rides up onto a travel contact surface 138 of canted wheel 120. Travel contact surface 138 comprises the tapered portion of canted wheel 120 nearest flared edge 134 (as shown) that is used to impart motion to two-wheel carrier 100. That is, travel contact surface 138 is the portion of canted wheel 120 that is in contact with a surface when two-wheel carrier 100 is in motion. Referring again to FIG. 1, wheel assemblies 110A and 110B are designed so that the two canted wheels 120 can be canted inward toward battery housing 112, as shown.

Without wishing to be bound to any one particular theory, it is thought that angling canted wheels 120 inward relative to battery housing 112 or other support imparts stability to two-wheel carrier 100. In such embodiments, canted wheels 120 make contact with a surface, e.g., the ground, directly under a midpoint of the carrier, as opposed to making contact with a surface under the outer edges of the carrier, for example, if the canted wheels are angled outward, i.e., away from battery housing 120.

Additional views of two-wheel carrier 100 are shown with reference to FIG. 3, FIG. 4, and FIG. 5. More particularly, FIG. 3, FIG. 4, and FIG. 5 illustrate a top view, a bottom view, and an end view, respectively, of two-wheel carrier 100, wherein the bottom view of two-wheel carrier 100 shown in FIG. 4 is without canted wheels 120. In FIG. 1 through FIG.

5, representative, non-limiting dimensions are shown (in inches) of the various components and assemblies of two-wheel carrier 100. In one embodiment, an overall length of two-wheel carrier 100 is about 20.52 inches, an overall width of two-wheel carrier 100 is about 11.188 inches, and an overall height of two-wheel carrier 100 is about 4.813 inches. Further, in one embodiment, a diameter of each canted wheel 120 is about 10 inches. Two-wheel carrier 100 is not limited, however, to these dimensions and other dimensions shown in FIG. 1 through FIG. 5. These dimensions are exemplary only. Two-wheel carrier 100 can be scaled to any size. Accordingly, the capacity of the battery (not shown) can be scaled accordingly and the capabilities of drive motor 116 and angle-adjusting motor 122 can be scaled accordingly.

Additionally, a controller (not shown) may be associated with two-wheel carrier 100 for controlling drive motor 116 and angle-adjusting motor 122. In one embodiment, if two-wheel carrier 100 is used as the base of a robot, the robot controller (e.g., an RF-based controller) can be used to control the overall functions of the robot, which includes controlling the two drive motors 116 and the two angle-adjusting motors 122 of two-wheel carrier 100.

Referring again to FIG. 1 through FIG. 5, two-wheel carrier 100 is a canted two-wheeled platform that has the capability to adjust the angles θ of the two canted wheels 120, which are the drive wheels. Further, the edges of the two canted wheels 120 are designed to make contact with a surface and to be canted inward. This inward canted angle θ of the wheels enables the weight of two-wheel carrier 100 and any load thereon to push down directly above the point of wheel contact with the surface. This feature gives two-wheel carrier 100 a low center of gravity, making two-wheel carrier 100 a stable base with the ability to adjust the angles θ of the two canted wheels 120 as necessary to stabilize two-wheel carrier 100 in a substantially upright position for use on many different types of terrain and conditions.

The angles θ of the two canted wheels 120 can be adjusted from about 0 degrees, which is the loading position, to about 20 degrees. The angle θ is not limited to a maximum of about 20 degrees. The higher the angle θ past 20 degrees, however, the more unstable two-wheel carrier 100 can become, which presents a risk of tipping over. Optionally, a mechanical hard stop or a software limit can be implemented in two-wheel carrier 100 to limit the maximum angle θ to, for example, about 20 degrees.

With the feature of the two canted wheels 120 being adjustable at any angle θ from about 0 degrees to about 20 degrees, the user has the ability to stabilize two-wheel carrier 100 on many different types of terrain. In one embodiment, on any flat hard surface, two-wheel carrier 100 can move smoothly with the two canted wheels 120 set an angle θ as low as about 5 degrees. At this angle θ of about 5 degrees two-wheel carrier 100 is very stable on this type of terrain. In another embodiment, on thick carpet or grass, the two canted wheels 120 are set at a higher angle θ for two-wheel carrier 100 to remain stable. Generally, the thicker or rougher the terrain, the higher the angle θ needs to keep two-wheel carrier 100 stable. Generally, the smoother and flatter the terrain, the lower the angle θ can be to keep two-wheel carrier 100 stable. Having two angle-adjusting motors 122 to adjust the respective angles θ of the two canted wheels 120, enables two-wheel carrier 100 to adjust to different types of terrain in real time while in motion. This feature enables optimum stability at all times.

With the feature of an angle-adjusting motor 122 for each of the canted wheels 120, the angle θ of each of the canted wheels 120 can be controlled individually. For example, the angle θ of one canted wheel 120 can be set at about 10 degrees, while the angle θ of the other canted wheel 120 can be set at about 15 degrees. This feature can be useful if two-wheel carrier 100 comes into contact with different types of terrain under each canted wheel 120, such as a hard floor under one canted wheel 120 and carpet under the other canted wheel 120.

With the canted wheels 120 in the 0-degree position, the two canted wheels 120 are flat on a surface, which gives two-wheel carrier 100 zero movement, good stability for loading, and good stability for storage thereof.

The angle θ of the canted wheels 120 can be adjusted using any number of mechanisms. For example, depending on the size (diameter) of two-wheel carrier 100, hydraulics can be used, electric gear motors can be used, electric actuators can be used, and manual adjustments can be used. Further, at a larger scale, a gas or diesel engine could be used to drive the canted wheels 120. The weight and height of two-wheel carrier 100 can, in some embodiments, determine the diameter of the canted wheels 120. That is, the heavier, larger, and taller two-wheel carrier 100 when loaded, the larger the diameter of the canted wheels 120 needs to be for two-wheel carrier 100 to remain stable.

FIG. 6 illustrates a flow diagram of an embodiment of a method 600 of using two-wheel carrier 100 that includes adjustable canted wheels. Method 600 includes, but is not limited to, the following steps, which can be performed in any order.

At a step 610, two-wheel carrier 100 is at rest with the canted wheels 120 in the 0-degree position. More particularly, using the two angle-adjusting motors 122, the angles θ of the canted wheels 120 are set at about θ degrees and the two drive motors 116 are deactivated, which is a useful state for loading or storing two-wheel carrier 100.

At a step 615, two-wheel carrier 100 is placed in motion with the angles θ of the two canted wheels 120 set to any angle that is greater than 0 degrees. For example, using the two angle-adjusting motors 122, the angles θ of the two canted wheels 120 is set to at least 5 degrees and the two drive motors 116 are activated, thereby placing two-wheel carrier 100 in motion.

At a step 620, the two drive motors 116 of the two canted wheels 120, respectively, are controlled to affect a turning motion in two-wheel carrier 100. For example, a turning motion is achieved in two-wheel carrier 100 by controlling the rotational motion of the two canted wheels 120 differently via their respective drive motors 116, whereas the two drive motors 116 can be controlled individually.

At a step 625, the angles θ of the canted wheels 120 are controlled to affect optimal stability of two-wheel carrier 100. For example, optimal stability is achieved in two-wheel carrier 100 by controlling the angles θ of the two canted wheels 120 using respective angle-adjusting motors 122, whereas the two angle-adjusting motors 122 can be controlled individually. The respective angles θ of the two canted wheels 120 can be the same or different. In one embodiment, the angle θ of both of the canted wheels 120 is set at about 10 degrees. In another embodiment, the angle θ of one canted wheel 120 can be set at about 10 degrees, while the angle θ of the other canted wheel 120 can be set at about 15 degrees. The setting of the respective angles θ of the two canted wheels 120 can be controlled, for example, based on the type of terrain beneath each of the two canted wheels 120.

At a step 630, two-wheel carrier 100 is returned to rest with the canted wheels 120 in the 0-degree position. More particularly, the two drive motors 116 are deactivated and the angles θ of the two canted wheels 120 are returned to about 0 degrees.

FIG. 7 illustrates a side view of an embodiment of a two-wheel carrier 700 that includes fixed canted wheels 120 (in contrast to adjustable canted wheels 120 as shown in FIGS. 1 through 5). Two-wheel carrier 700 is an embodiment of a two-wheeled movable platform, carrier, or base. In this embodiment, two-wheel carrier 700 includes a pair of wheel assemblies 710 mechanically coupled to battery housing 112. For example, a wheel assembly 710A is mechanically coupled to one side of battery housing 112 and a wheel assembly 710B is mechanically coupled to an opposite side of battery housing 112, as shown. Each of the wheel assemblies 710 includes, for example, a fixed wheel support 712 that houses drive motor 116 which is driving canted wheel 120. In the fixed wheel supports 712, the canted wheels 120 are set at a fixed angle θ. The fixed angle θ can be, for example, from about 5 degrees to about 20 degrees, including 0, 1, 2, 3, 4, 5, 6, 7, 8, 9, 10, 11, 12, 13, 14, 15, 16, 17, 18, 19, and 20 degrees, and fractions of whole degrees thereof, for example, 0.5, 1.5, 2.5, 3.5, 4.5, 5.5, 6.5, 7.5, 8.5, 9.5, 10.5, 11.5, 12.5, 13.5, 14.5, 15.5, 16.5, 17.5, 18.5, and 19.5 degrees, or in other embodiments, 0.25, 1.25, 2.25, 3.25, 4.25, 5.25, 6.25, 7.25, 8.25, 9.25, 10.25, 11.25, 12.25, 13.25, 14.25, 15.25, 16.25, 17.25, 18.25, and 19.25 degrees, or, in yet other embodiments, 0.75, 1.75, 2.75, 3.75, 4.75, 5.75, 6.75, 7.75, 8.75, 9.75, 10.75, 11.75, 12.75, 13.75, 14.75, 15.75, 16.75, 17.75, 18.75, and 19.75 degrees. In one embodiment, the fixed angle θ is about 13 degrees.

Two-wheel carrier 700 includes substantially the same features and advantages as two-wheel carrier 700 that is shown and described in FIG. 1 through FIG. 5, except that the angles θ of the two canted wheels 120 is not adjustable. The fixed 13-degree angle is well-suited for most standard flat terrain, hard floor, and carpet. More particularly, the fixed 13-degree angle is suited to provide basic stability in two-wheel carrier 700. Again, the top of battery housing 112 can serve as a platform for carrying a load (not shown). Alternatively, a separate platform (not shown) can be mounted atop battery housing 112 for carrying a load (not shown).

Other views of two-wheel carrier 700 are shown with reference to FIG. 8, FIG. 9, FIG. 10, and FIG. 11. More particularly, FIG. 8, FIG. 9, FIG. 10, and FIG. 11 illustrate a perspective view, a side view, a top view, and a bottom view, respectively, of two-wheel carrier 700, which includes fixed canted wheels 120 instead of adjustable canted wheels 120.

Unless defined otherwise, all technical and scientific terms used herein have the meaning commonly understood by a person skilled in the art to which the presently disclosed subject matter belongs.

Following long-standing patent law convention, the terms "a," "an," and "the" refer to "one or more" when used in this application, including the claims. Thus, for example, reference to "an assembly" includes a plurality of assemblies, unless the context clearly is to the contrary (e.g., a plurality of assemblies), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A platform, carrier, or base comprising:

a first wheel assembly and a second wheel assembly mechanically coupled to a support unit, wherein the support unit has at least a first side and a second side that are configured to be opposite one another, wherein the first wheel assembly is mechanically coupled to the first side of the support unit and the second wheel assembly is mechanically coupled to the second side of the support unit;

wherein each wheel assembly comprises a mounting plate, a drive motor, a motor housing, a wheel, and an angle-adjusting motor;

wherein the drive motor is mechanically coupled to the wheel by a drive shaft; the motor housing is moveably coupled to the mounting plate by a first hinge; the angle-adjusting motor is movably coupled to the mounting plate by a second hinge; and wherein the angle-adjusting motor comprises a lead screw and the motor housing comprises a lead screw coupler comprising a receptacle comprising a threaded opening for receiving the lead screw of the angle-adjusting motor; and wherein the angle-adjusting motor can be activated to position each of the two wheels at an angle θ relative to a plane parallel to at least one surface upon which the platform, carrier, or base is placed, wherein the angle θ for each of the two wheels can be the same or different and has a range from about 0 degrees to about 20 degrees.

2. A method of using a platform, carrier, or base comprising:

a first wheel assembly and a second wheel assembly mechanically coupled to a support unit, wherein the support unit has at least a first side and a second side that are configured to be opposite one another, wherein the first wheel assembly is mechanically coupled to the first side of the support unit and the second wheel assembly is mechanically coupled to the second side of the support unit;

wherein each wheel assembly comprises a mounting plate, a drive motor, a motor housing, a wheel, and an angle-adjusting motor;

wherein the drive motor is mechanically coupled to the wheel by a drive shaft; the motor housing is moveably coupled to the mounting plate by a first hinge; the angle-adjusting motor is movably coupled to the mounting plate by a second hinge; and wherein the angle-adjusting motor comprises a lead screw and the motor housing comprises a lead screw coupler comprising a receptacle comprising a threaded opening for receiving the lead screw of the angle-adjusting motor; and wherein the angle-adjusting motor can be activated to position each of the two wheels at an angle θ relative to a plane parallel to at least one surface upon which the platform, carrier, or base is placed, wherein the angle θ for each of the two wheels can be the same or different and has a range from about 0 degrees to about 20 degrees;

the method comprising the following steps, which can be performed in any order and in any combination:

(a) adjusting the angles θ of each wheel to about zero degrees; deactivating each drive motor; and optionally loading or storing the platform, carrier, or base;

(b) setting the platform, carrier, or base in motion with the angles θ of each wheel set to any angle that is greater than 0 degrees;

(c) controlling each drive motor to affect a turning motion in the platform, carrier, or base by controlling the rotational motion of each wheel differently via their respective drive motors, wherein each drive motors can be controlled individually;

(d) using each respective angle-adjusting motor to control the angle θ of each wheel to affect optimal stability of the platform, carrier, or base, wherein each angle-adjusting motor can be controlled individually and the angles θ of each wheel can be the same or different; and (e) returning the platform, carrier, or base to rest with each wheel in the zero-degree position and optionally deactivating each drive motor.

* * * * *